US008431219B2

United States Patent
Iwata et al.

(10) Patent No.: US 8,431,219 B2
(45) Date of Patent: Apr. 30, 2013

(54) OPTICAL LAYERED BODY INCLUDING AN ANTIGLARE LAYER CONTAINING ORGANIC PARTICLES AND NONSPHERICAL SILICA PARTICLES

(75) Inventors: Yukimitsu Iwata, Tokyo (JP); Gen Furui, Tokyo (JP); Takashi Kodama, Tokyo (JP); Mariko Hayashi, Tokyo (JP); Sanae Yoshida, Tokyo (JP); Kiyoshi Itoh, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 521 days.

(21) Appl. No.: 12/017,796

(22) Filed: Jan. 22, 2008

(65) Prior Publication Data

US 2009/0015926 A1 Jan. 15, 2009

(30) Foreign Application Priority Data

Jan. 22, 2007 (JP) ................. 2007-012056

(51) Int. Cl.
*G02B 5/02* (2006.01)
(52) U.S. Cl.
USPC ............ 428/331; 428/212; 428/332; 359/601
(58) Field of Classification Search .................. 359/601, 359/609, 614; 428/143, 149, 156, 212, 220, 428/323, 325, 331, 332
See application file for complete search history.

(56) References Cited

U.S. PATENT DOCUMENTS

| | | | | |
|---|---|---|---|---|
| 2005/0207016 A1* | 9/2005 | Ando | ............................ | 359/586 |
| 2006/0132922 A1* | 6/2006 | Takao et al. | .................... | 359/601 |
| 2007/0104896 A1* | 5/2007 | Matsunaga et al. | ............ | 428/1.3 |
| 2007/0253064 A1* | 11/2007 | Ookubo et al. | ............... | 359/599 |
| 2009/0052043 A1 | 2/2009 | Iwata et al. | | |

FOREIGN PATENT DOCUMENTS

| | | |
|---|---|---|
| JP | 2000258606 | 9/2000 |
| JP | 2002207109 | 7/2002 |
| JP | 2004069867 | 3/2004 |
| JP | 2005107005 | 4/2005 |
| JP | 2005-316450 A | 11/2005 |
| JP | 2006095997 | 4/2006 |
| JP | 2006126808 | 5/2006 |
| WO | WO-2006/088205 A1 | 8/2006 |

* cited by examiner

*Primary Examiner* — Mark Consilvio
(74) *Attorney, Agent, or Firm* — Novak Druce Connolly Bove + Quigg LLP (57) ABSTRACT

In view of the above state of the art, it is an object of the present invention to provide an optical layered body which can prevent the agglomeration of silica particles and form the desired surface roughness on the surface.

An optical layered body comprising a light-transmitting substrate and an antiglare layer having a surface roughness on its surface,
wherein said antiglare layer is a resin layer containing an organic particle and a nonspherical silica, and
a weight ratio of organic particle/nonspherical silica is from 1/10 to 60/10.

22 Claims, 2 Drawing Sheets

OPTICAL LAYERED BODY INCLUDING AN ANTIGLARE LAYER CONTAINING ORGANIC PARTICLES AND NONSPHERICAL SILICA PARTICLES

TECHNICAL FIELD

The present invention relates to an optical layered body, a method of producing the same, a polarizer and an image display device.

BACKGROUND ART

An optical layered body including functional layers having various functions is provided on the outermost surfaces of image display devices such as cathode ray tube (CRT) display devices, liquid crystal displays (LCD), plasma displays (PDP), and electroluminescence displays (ELD).

As one of such functional layers, it is known to include an antiglare layer having a surface roughness on its surface in order to improve the reflection of a image on an image display screen due to the reflection of external light and the deterioration of visibility due to interface reflection (Japanese Kokai Publication 2006-126808, Japanese Kokai Publication 2006-95997, and Japanese Kokai Publication 2005-107005). As one of methods of forming a layer having a surface roughness on its surface, it is known a method of forming the surface roughness by adding particles of silica or the like (Japanese Kokai Publication 2000-258606).

There has been a demand in recent years for improvements in display performance in image display devices with an antiglare property to begin with, and with gloss blackness (a black to gray level is favorable, enabling a clear moving picture), i.e. without white muddiness. In order to correspond to this demand, adjustment for achieving a finer surface roughness at an antiglare layer and a constitution for giving internal scattering properties in a coat are further required as long as the surface performance of the antiglare layer being maintained is not deteriorated.

However, since, in the silica particles, the agglomeration of particles occurs, there is a problem that it is difficult to control a desired surface roughness, and to provide the internal scattering property. In order to prevent such a problem, organic resin beads are often used (Japanese Kokai Publication 2004-69867 and Japanese Kokai Publication 2002-207109). However, when the organic resin beads are used, there is a problem that production cost becomes high.

Therefore, it is difficult to produce an optical layered body at low cost, which can make a surface roughness of the surface of the antiglare layer to be fine and control to be the desired configuration.

SUMMARY OF THE INVENTION

In view of the above state of the art, it is an object of the present invention to provide an optical layered body in which the desired surface roughness is formed without the agglomeration of silica particles.

The present invention provides an optical layered body comprising a light-transmitting substrate and an antiglare layer having a surface roughness on its surface, wherein the antiglare layer is a resin layer containing an organic particle and a nonspherical silica, and a weight ratio of organic particle/nonspherical silica is from 1/10 to 60/10.

The organic particle preferably comprises at least one species selected from the group consisting of polymers of methyl methacrylate, melamine, benzoguanamine or styrene, and copolymers thereof.

The organic particle preferably has an average particle diameter of 1 to 10 μm.

The nonspherical silica preferably has an average particle size of 0.5 to 5 μm.

The total content of the organic particles and the nonspherical silica is preferably 1 to 40 parts by weight with respect to 100 parts by weight of the solid content of a binder resin.

Preferably, the optical layered body of the present invention further comprises an antistatic layer, and the antistatic layer and the antiglare layer, in this order, are provided on the light-transmitting substrate.

The optical layered body of the present invention preferably further comprises a low refractive index layer on the antiglare layer.

The present invention provides a method of producing an optical layered body including a light-transmitting substrate and an antiglare layer having a surface roughness on its surface, comprising a step of forming the antiglare layer by applying a composition for forming an antiglare layer, containing a binder resin, an organic particle and a nonspherical silica, wherein the composition for forming an antiglare layer contains the organic particle and the nonspherical silica, and a weight ratio of organic particles/nonspherical silica is from 1/10 to 60/10.

The present invention also provides a self-luminous image display device including the optical layered body described above on the outermost surface.

The present invention also provides a polarizer comprising a polarizing element, wherein the polarizer includes the optical layered body described above on a surface of the polarizing element.

The present invention also provides a non-self-luminous image display device including the optical layered body or the polarizer on the outermost surface.

DETAILED DESCRIPTION OF THE INVENTION

Hereinafter, the present invention will be described in detail.

The present invention provides an optical layered body comprising a light-transmitting substrate and an antiglare layer having a surface roughness on its surface, wherein the antiglare layer contains organic particles and nonspherical silica, and a weight ratio of organic particles/nonspherical silica is from 1/10 to 60/10. Therefore, in the present invention, an antiglare layer having the desired surface roughness can be formed, and thereby an optical layered body which is superior in visibility such as an antiglare property, a preventing scintillation property, and contrast, and appearance without white muddiness can be attained.

The antiglare layer has a surface roughness on its surface for the purpose of preventing the deterioration of visibility due to the reflection of external light on an image display screen, the reflection of an image, the reflected color irregularity due to optical interference occurring at the interface between the antiglare layer and other layer, and the like.

Particularly in recent years, the improvement of the surface roughness, mainly including an antiglare property, is needed, and the formation of such a surface roughness relies on surface roughness having a comparatively small size.

Figure 2:
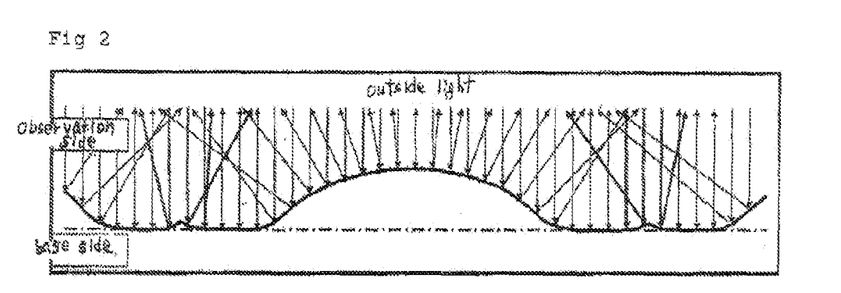
FIG. 2 is an example of a cross-sectional view of an antiglare layer having a surface roughness formed by using only nonspherical silica.

In order to form such a surface roughness, it is necessary to mix a large amount of particles having a small particle size. However, it has been difficult to form the desired surface roughness since the occurrence of particle agglomeration causes coarse surface roughness to be formed on the surface (FIG. 2).

According to the present invention, the agglomeration of silica particles can be inhibited by adding organic particles to readily form the desired surface roughness.

In the optical layered body of the present invention, the antiglare layer contains organic particles in addition to nonspherical silica. Thereby, the agglomeration of the nonspherical silica can be prevented. Furthermore, it is estimated that since the optical layered body of the present invention contains the nonspherical silica and the organic particles in a specific ratio, the agglomeration of the nonspherical silica can be controlled and finer surface roughness can be suitably formed without forming large surface roughness.

Figure 1:
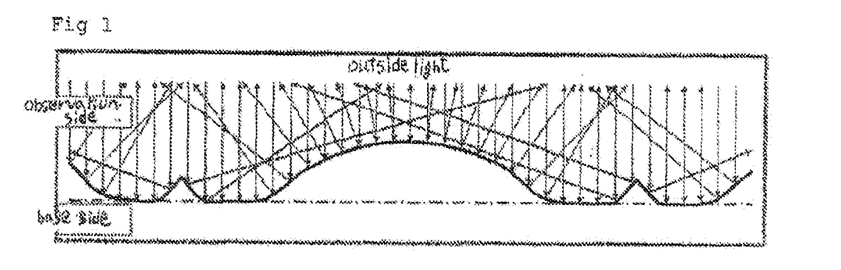
FIG. 1 is an example of a cross-sectional view of an antiglare layer in an optical layered body of the present invention.

FIG. 1 shows a cross-sectional view of an antiglare layer in an optical layered body of the present invention. FIG. 2 shows a cross-sectional view of an antiglare layer having a surface roughness formed by using only nonspherical silica. As shown in FIG. 2, the use of only nonspherical silica 11 facilitates the agglomeration of the silica, consequently leading to formation of a comparatively large surface roughness 10. Meanwhile, in a surface roughness 1, in the present invention shown in FIG. 1, formed by using a predetermined amount of nonspherical silica 2 and organic particles 3, the presence of the organic particles 3 inhibits the agglomeration of nonspherical silica 2, consequently leading to formation of a finer surface roughness 1.

According to the optical layered body of the present invention, an antiglare layer having the desired surface roughness on its surface can be formed, and therefore it can be an optical layered body which is superior in visibility such as an antiglare property, a preventing scintillation property, and contrast, and appearance without white muddiness. Further, it is possible to produce the optical layered body having such an excellent function at low cost.

The antiglare layer contains organic particles and nonspherical silica, and a weight ratio of organic particles/nonspherical silica is from 1/10 to 60/10. By thus adding the organic particles and the nonspherical silica to the antiglare layer in the above weight ratio, the agglomeration of silica particles can be prevented and the desired surface roughness can be formed.

If the weight ratio is less than 1/10, the agglomeration of silica particles is not inhibited adequately. If the weight ratio is more than 60/10, the organic particles agglomerate strongly, thereby the surface roughness is not controlled. The weight ratio is preferably 5/10 to 50/10, and more preferably 7/10 to 35/10.

The organic particles preferably include at least one species selected from the group consisting of polymers of methyl methacrylate, melamine, benzoguanamine or styrene, and copolymers thereof. Among others, the organic particles more preferably include a copolymer of methacrylate and styrene in terms of formation of a uniform mixture system when the organic particles are mixed with the silica particle, and formation of a film having better screen quality and a higher effect of preventing scintillation.

The organic particles preferably have an average particle diameter of 1 to 10 μm. If the average particle diameter is less than 1 μm, the formation of the desired surface roughness requires a large amount of particles, which may lead to a reduction in contrast and light transmittance or an increase in costs. If the average particle diameter is more than 10 μm, the size of the particle itself may be visible as a large defect such as a difficulty in forming a fine and uniform surface roughness. More preferably, the average particle diameter is 1.5 to 5 μm. In addition, the average particle diameter is obtained by measuring the particles in the form of a 5% by weight dispersion of particles in toluene with a Coulter counter.

Examples of commercialized products of the organic particles include polymethyl methacrylate beads produced by SEKISUI CHEMICAL Co., Ltd. and polystyrene beads produced by Soken Chemical & Engineering Co., Ltd, and the like.

The antiglare layer contains nonspherical silica. By employing a nonspherical substance as a silica particle, the antiglare layer without white muddiness may be formed in the appropriate blending. In addition to this, spherical silica, a crosslinked acrylic particle, a $TiO_2$ particle, or the like may be used in combination.

The nonspherical silica preferably has an average particle size of 0.5 to 5 μm. If the average particle size is less than 0.5 μm, the formation of the desired surface roughness requires a large amount of particles, and the particles are used a lot, and therefore it may become difficult to form a uniform layer. If the average particle size is more than 5 μm, since surface roughness become larger, an effect of preventing scintillation may be deteriorated. More preferably, the average particle size is 1.0 to 2.5 μm.

The average particle size is obtained by measuring the particles in the form of a 5% by weight dispersion of particles in toluene with a Coulter counter.

Examples of commercialized products of the nonspherical silica include nonspherical silica-containing ink produced by Dainichiseika Color & Chemicals Mfg. Co., Ltd.

The total content of the organic particle and the nonspherical silica is preferably 1 to 40 parts by weight with respect to 100 parts by weight of the solid content of a binder resin. If the total content is less than 1 part by weight, the desired surface roughness can be formed. If the total content is more than 40 parts by weight, the surface of the layer may be white muddiness, the appearance of it may be deteriorated and transparency may become low. More preferably, the total content is 5 to 25 parts by weight.

The antiglare layer may contain internal scattering particles in addition to the organic particles. The internal scattering particles can provide internal haze and inhibit scintillation. Further, a part of or all of the organic particles may be a resin having an internal scattering function.

Examples of the internal scattering particles include organic particles in which the difference in a refractive index between the organic particles and a binder resin composing the antiglare layer is relatively large, for example, plastic beads of monodispersion spherical particles, or the like, such as acrylic beads (refractive index: 1.49 to 1.53), polyethylene beads (refractive index: 1.50), polystyrene beads (refractive index: 1.60), styrene-acrylic copolymer beads (refractive index: 1.54 to 1.55), polycarbonate beads (refractive index: 1.57), polyvinyl chloride beads (refractive index: 1.60), melamine beads (refractive index: 1.57), melamine-formaldehyde condensate beads (refractive index: 1.66), benzoguanamine-formaldehyde condensate beads (refractive index: 1.66), benzoguanamine-melamine-formaldehyde condensate beads (refractive index: 1.66), and benzoguanamine-melamine condensate beads (refractive index: 1.66).

The internal scattering particles preferably have an average particle diameter of 1 to 10 μm. If it is less than 1 μm, too small particles cause Mie scattering and Rayleigh scattering, the reflection of external light results in white muddiness, and optical properties and appearance may be deteriorated. If the average particle diameter is more than 10 μm, the surface roughness may become larger and the desired surface roughness may not be formed. The average particle diameter is more preferably 1.5 to 5 μm.

The content of the internal scattering particle is preferably 1 to 20 parts by weight with respect to 100 parts by weight of the solid content of a binder resin. If the content is less than 1 part by weight, an effect of providing internal haze may not be adequately obtained. If the content is more than 20 parts by weight, optical properties may be deteriorated. More preferably, the content is 3 to 18 parts by weight.

The antiglare layer further includes a binder resin.

As the binder resin which can be used for the antiglare layer, a transparent resin is preferable, and examples of the binder resin include, for example, ionizing radiation-curable resins which are resins to be cured with ultraviolet light or electron beams; a mixture of the ionizing radiation-curable resin and a solvent-drying type resin (a resin, such as a thermoplastic resin, in which a coat is formed by only evaporating a solvent previously added in order to adjust a solid content during the application of the resin); and a thermosetting resin. More preferably, the binder resin is the ionizing radiation-curable resin. In addition, as used herein, the term "resin" includes resin components such as a monomer and an oligomer.

Examples of the ionizing radiation-curable resins include compounds having one or more unsaturated bonds such as compounds having acrylate functional groups. Examples of the compounds having one unsaturated bond include ethyl (meth)acrylate, ethylhexyl(meth)acrylate, styrene, methylstyrene, N-vinylpyrrolidone, and the like. Examples of the compounds having two or more unsaturated bonds include a polyfunctional compound such as polymethylolpropane tri(meth)acrylate, hexanediol di(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate or neopentyl glycol di(meth)acrylate; and reaction products (for example, a poly(meth)acrylate ester of polyhydric alcohol) of the polyfunctional compound with (meth)acrylate, and the like. In addition, as used herein, "(meth)acrylate" refers to methacrylate or acrylate.

Besides the compound, a polyester resin, a polyether resin, an acrylic resin, an epoxy resin, a urethane resin, an alkyd resin, a spiroacetal resin, a polybutadiene resin, and a polythiol-polyen resin, which have an unsaturated double bond and a relatively low molecular weight, can also be used as the ionizing radiation-curable resin.

The ionizing radiation-curable resin can also be used in combination with the solvent-drying type resin. By using the ionizing radiation-curable resin in combination with the solvent-drying type resin, coat defects of a coated surface can be effectively prevented and thereby a more excellent gloss blackness can be attained. The solvent-drying type resin, which can be used in combination with the ionizing radiation-curable resin, is not particularly limited, and a thermoplastic resin can be generally used.

The thermoplastic resin is not particularly limited, and examples of the thermoplastic resin include styrene resins, (meth)acrylic resins, vinyl acetate resins, vinyl ether resins, halogen-containing resins, alicyclic olefin resins, polycarbonate resins, polyester resins, polyamide resins, cellulose derivatives and silicone resins, rubbers or elastomers, and the like. The thermoplastic resin is preferably non-crystalline and soluble in organic solvents (particularly, common solvent in which a plurality of polymers or curable compounds can be dissolved). Particularly from the viewpoint of a film forming property, transparency and weather resistance, styrene resins, (meth)acrylic resins, alicyclic olefin resins, polyester resins, and cellulose derivatives (cellulose esters, etc.) are preferable.

In the optical layered body of the present invention, when a material of the light-transmitting substrate is a cellulose resin such as triacetyl cellulose (TAC), preferable specific examples of the thermoplastic resins include cellulose derivatives such as cellulose resins, for example, nitrocellulose, acetyl cellulose, cellulose acetate propionate, ethyl hydroxyethyl cellulose, acetylbutyl cellulose, ethyl cellulose, methyl cellulose, and the like. By using the cellulose resin, it is possible to improve the adhesion of the antiglare layer to the light-transmitting substrate or the antistatic layer formed as desired, and transparency. Furthermore, besides the cellulose resins, examples of the thermoplastic resins include vinyl resins such as vinyl acetate and copolymers thereof, vinyl chloride and copolymers thereof, and vinylidene chloride and copolymers thereof, acetal resins such as polyvinyl formal, and polyvinyl butyral, acrylic resins such as an acrylic resin and copolymers thereof, a methacrylic resin and copolymers thereof, polystyrene resins, polyamide resins, polycarbonate resins, and the like.

Examples of the thermosetting resin, which can be used as the binder resin, include a phenol resin, a urea resin, a diallylphthalate resin, a melamine resin, a guanamine resin, an unsaturated polyester resin, a polyurethane resin, an epoxy resin, an aminoalkyd resin, a melamine-urea co-condensation resin, a silicon resin, a polysiloxane resin and the like.

The antiglare layer may include other components as required in addition to the components described above. Examples of the other components include a photopolymerization initiator, a leveling agent, a crosslinking agent, a curing agent, a polymerization accelerator, a viscosity adjustment agent, and the like.

Examples of the photopolymerization initiator include acetophenones (for example, trade name "Irgacure 184", 1-hydroxy-cyclohexyl-phenyl-ketone produced by Ciba Specialty Chemicals Inc., and trade name "Irgacure 907", 2-methyl-[4-(methylthio)phenyl]-2-morpholinopropane-1-on produced by Ciba Specialty Chemicals Inc.), benzophenones, thioxanthones, benzoin, benzoin methyl ether, an aromatic diazonium salt, an aromatic sulfonium salt, an aromatic iodonium salt, a metallocene compound, and benzoin sulfonate. These compounds may be used singly or in combination of two or more species.

The addition amount of the photopolymerization initiator is preferably 0.1 to 10 parts by weight with respect to 100 parts by weight of the solid content of the ionizing radiation-curable resin.

Publicly known agents may be used for the leveling agent, crosslinking agent, curing agent, polymerization accelerator, and viscosity adjustment agent.

The antiglare layer can be formed by using a composition for forming an antiglare layer prepared by mixing and dispersing the binder resin and other components such as the internal scattering particles, in addition to the nonspherical silica and organic particles in the specific ratio, with a solvent. A paint shaker, a beads mill, or the like may be used for mixing or dispersing.

Examples of the solvent include alcohols (examples: methanol, ethanol, isopropanol, butanol and benzyl alcohol), ketones (examples: acetone, methyl ethyl ketone, methyl isobutyl ketone and cyclohexanone), esters (examples: methyl acetate, ethyl acetate, propyl acetate, butyl acetate, methyl formate, ethyl formate, propyl formate and butyl formate), aliphatic hydrocarbons (examples: hexane and cyclohexane), halogenated hydrocarbons (examples: methylene chloride, chloroform and carbon tetrachloride), aromatic hydrocarbons (examples: benzene, toluene, xylene), amides (examples: dimethylformamide, dimethylacetamide and n-methylpyrrolidone), ethers (examples: diethyl ether, dioxane and tetrahydrofuran) and ether alcohols (examples:

1-methoxy-2-propanol), but the solvent is not limited to these compounds. Among others, ketone solvents are preferable in terms of dispersibility, dispersion stability, and safety.

The antiglare layer is preferably formed by applying the composition for forming an antiglare layer onto a light-transmitting substrate or an antistatic layer described later, drying the composition as required, and curing the composition by irradiation of active energy rays.

Examples of a method of applying the composition for forming an antiglare layer include application methods such as a roller coating method, a Myer bar coating method, a gravure coating method, and the like.

Examples of the irradiation of active energy rays include irradiation with ultraviolet light or an electron beam. Specific examples of an ultraviolet source include light sources such as an ultra high-pressure mercury lamp, a high-pressure mercury lamp, a low-pressure mercury lamp, a carbon arc lamp, a black light fluorescent lamp and a metal halide lamp. As the wavelength of the ultraviolet light, a wavelength band of 190 to 380 nm can be used. Specific examples of an electron beam source include various electron beam accelerators of a Cockcroft-Walton type, a van de Graaff type a resonance transformer type, an insulating core transformer type, or a linear type, a Dynamitron type and a high-frequency type.

The (dried) layer thickness of the antiglare layer is preferably 1 to 10 µm. If the layer thickness is less than 1 µm, the desired surface roughness cannot be formed, and the strength of the layer itself may be insufficient. If the layer thickness is more than 10 µm, optical properties may be deteriorated. The layer thickness is more preferably 2 to 6 µm.

Further, the layer thickness can be measured through cross section observation by a laser scanning microscope, SEM, or TEM. For example, in measuring the layer thickness with a laser scanning microscope, a cross section of the antiglare layer is observed in a transmission mode with a confocal laser scanning microscope (Leica TCS-NT: manufactured by Leica Microsystems GmbH: a magnification of 200 to 1000 times). Specifically, a wet objective lens is applied to the confocal laser scanning microscope in order to obtain clear images without halation, and about 2 ml of oil with a refractive index of 1.518 is placed on the cross section of the antiglare layer in order to eliminate an air layer between the objective lens and the cross section of antiglare layer, and then the layer thickness can be observed. Further, a film of the highest projection portion and a film of the lowest depression portion in the surface roughness per one image screen of a microscope, namely two films are measured on the layer thickness. This measurement is repeated for 5 image screens to yield 10 measured values, and an average value is calculated from these 10 measured values to determine an average layer thickness. In the cross section observation by SEM or TEM, an average value can be determined through the observation of 5 image screens.

The antiglare layer is preferably a layer exhibiting the hardness of "class H or higher" in Scratch hardness (Pencil method) specified by JIS K 5600-5-4 (1999). When the antiglare layer has the hardness, it is possible to impart hardness to the optical layered body. When the hardness is imparted to the optical layered body, a layer thickness is preferably 1 to 10 µm, more preferably 2 to 6 µm.

The optical layered body of the present invention comprises a light-transmitting substrate.

The light-transmitting substrate is preferably a substrate having transparency, smoothness and heat resistance, and superior in mechanical strength. Specific examples of materials for forming the above light-transmitting substrate include thermoplastic resins such as acrylic (polymethyl methacrylate), polyester (polyethylene terephthalate, polyethylene naphthalate, polybutylene terephthalate, polybutylene naphthalate), triacetyl cellulose (TAC), cellulose diacetate, cellulose acetate butylate, polyamide, polyimide, polyethersulfone, polysulfone, polypropylene, polymethylpentene, polyvinyl chloride, polyvinyl acetal, polyether ketone, polycarbonate and polyurethane. Polyester (polyethylene terephthalate, polyethylene naphthalate) and triacetyl cellulose are preferable.

As the light-transmitting substrate, a film of amorphous olefin polymer (Cyclo-Olefin-Polymer: COP) having an alicyclic structure can also be used. This is a substrate in which norbornene polymers, monocyclic olefin polymers, cyclic conjugated diene polymers, vinyl alicyclic hydrocarbon polymer resins, and the like, are used. Examples of this amorphous olefin polymer include ZEONEX or ZEONOA (norbornene resin) produced by ZEON Corporation, SUMILITE FS-1700 produced by SUMITOMO BAKELITE Co., Ltd., ARTON (modified norbornene resin) produced by JSR Corporation, APEL (cyclic olefin copolymer) produced by Mitsui Chemicals, Inc., TOPAS (cyclic olefin copolymer) produced by Ticona Inc. and OPTOREZ OZ-1000 series (alicyclic acrylic resin) produced by Hitachi Chemical Co., Ltd.). In addition, FV series (low birefringence and low photoelastic coefficient film) produced by Asahi Kasei Chemicals Corporation are also preferable as an alternative substrate of triacetyl cellulose.

As the light-transmitting substrate, the thermoplastic resin is preferably used in a film form, which is rich in flexibility, but plates of these thermoplastic resins may be used or a plate-like body of glass plate may be used in accordance with use pattern requiring curability.

The thickness of the light-transmitting substrate is preferably 20 to 300 µm, and more preferably 30 to 200 µm. When the light-transmitting substrate is a plate-like body, the thickness of the light-transmitting substrate may have a thickness of 300 to 5000 µm, exceeding the thickness of the above range. The substrate may have be subjected to application of an anchor agent or a coating material referred to as a primer onto the substrate in advance, in addition to physical treatments such as a corona discharge treatment and an oxidation treatment, in order to improve the adhesive property of the substrate when the antistatic layer is formed on the substrate.

The optical layered body of the present invention preferably comprises an antistatic layer. The antistatic layer preferably exists on the light-transmitting substrate.

The antistatic layer can be formed by using a composition for forming an antistatic layer, containing an antistatic agent, a resin and a solvent. The thickness of the antistatic layer is preferably about 30 nm to 1 µm.

Examples of the antistatic agent include a quaternary ammonium salt, a pyridinium salt, various cationic compounds having a cationic group such as a primary, a secondary, and a tertiary amino group; anionic compounds having a anionic group such as a sulfonate group, a sulfate group, a phosphate group and a phosphonate group; ampholytic compounds such as amino acid and aminosulfate; nonionic compounds such as amino alcohol, glycerin and polyethylene glycol; organic metal compounds such as alkoxide tin or titanium; and metal chelate compounds such as an acetylacetonate salt of the organic metal compound; and further include compounds formed by polymerizing the compounds described above. Further, polymerizable compounds such as monomer or oligomer which has a tertiary amino group, a quaternary ammonium group or a metal chelate moiety and is polymerizable with ionizing radiation, and organic metal compounds like a coupling agent having a functional group polymerizable with ionizing radiation can also be used as an antistatic agent.

Examples of the antistatic agent include conductive fine particles. Specific examples of conductive fine particles include substances containing metal oxides. Examples of the metal oxides include ZnO (refractive index 1.90, hereinafter, a value in a parenthesis represents a refractive index), $CeO_2$ (1.95), $Sb_2O_2$ (1.71), $SnO_2$ (1.997), indium tin oxide (1.95) often abbreviated as ITO, $In_2O_3$ (2.00), $Al_2O_3$ (1.63), antimony-doped tin oxide (abbreviation; ATO, 2.0), aluminum-doped zinc oxide (abbreviation; AZO, 2.0), and the like. A fine particle refers to a particle of 1 micron or smaller, that is sub micron, and is preferably a particle having an average particle diameter of 0.1 nm to 0.1 µm. Further, in accordance with a preferable aspect of the present invention, a primary particle diameter of the fine particle is about 30 to 70 nm, and a secondary particle diameter is about 200 nm or smaller.

Further, as the antistatic agent, organic conductive compositions can also be used, and examples of the organic conductive compositions include polymer conductive compositions, and further include, other than the organic compounds described above, aliphatic conjugated polyacetylene, aromatic conjugated poly(p-phenylene), heterocyclic conjugated polypyrrole, polythiophene, heteroatom-containing conjugated polyaniline, and mixed type conjugated poly(phenylenevinylene). Furthermore, examples of the organic conductive compositions include a double chain conjugated compound which is a conjugated compound having a plurality of conjugate chains in a molecule, and a conductive complex which is a polymer prepared by grafting or block-copolymerizing the conjugate polymer chain to a saturated polymer.

As the resin, a resin similar to the binder resins which can be used for the antiglare layer can be used.

As the solvent, a solvent similar to the solvents which can be used for the antiglare layer can be used.

In addition to the components described above, other components may be added to the antistatic layer as required within the bounds of not affecting the effect of the present invention. Examples of the other components include a resin other than the resins described above, an antiglare agent, a surfactant, a coupling agent, a thickening agent, an anticoloring agent, a coloring agent such as pigment or dye, an antifoaming agent, a leveling agent, a flame retarder, an ultraviolet absorber, an infrared absorber, a tackifier, a polymerization inhibitor, an antioxidant, a surface modifier, or the like. With respect to these components, publicly known components generally used in the antistatic layer can be used.

The antistatic layer may be preferably formed by applying the composition for forming an antistatic layer onto a light-transmitting substrate, drying the composition as required, and curing the composition by irradiation of active energy rays. Examples of a method of curing the composition include the same methods as in the antiglare layer.

The surface resistivity of the antistatic layer is preferably $10^{10}$ Ω/square or less. If the resistivity is not within the above range, adequate antistatic performance may not be exerted. More preferably, the surface resistivity is $10^9$ Ω/square or less.

The optical layered body of the present invention further preferably comprises a low refractive index layer.

The low refractive index layer is formed on the surface of the antiglare layer and has a lower refractive index than that of the antiglare layer. In accordance with a preferable aspect of the present invention, it is preferable to have a constitution in which the refractive index of the antiglare layer is 1.5 or more, and the refractive index of the low refractive index layer is less than 1.5 and more preferably 1.45 or less.

The low refractive index layer may be composed of any of 1) a material containing silica or magnesium fluoride, 2) a fluorine material being a low refractive index resin, 3) a fluorine material containing silica or magnesium fluoride, and 4) a thin film of silica or magnesium fluoride.

The fluorine material is a polymerizable compound containing fluorine atoms at least in a molecule or a polymer thereof. The polymerizable compound is not particularly limited, but a polymerizable compound having a curable and reactive group such as a functional group (ionizing radiation-curable group) to be cured with ionizing radiation or a polar group (heat-curable polar group) to be cured with heat is preferable. Further, compounds having these reactive groups simultaneously together may also be used.

As the polymerizable compounds having an ionizing radiation-curable group containing fluorine atoms, fluorine-containing monomers having an ethylenic unsaturated bond can be widely employed. More specifically, fluoroolefins (for example, fluoroethylene, vinylidene fluoride, tetrafluoroethylene, hexafluoropropylene, perfluorobutadiene, perfluoro-2,2-dimethyl-1,3-dioxole, etc.) can be exemplified. Examples of polymerizable compounds having a (meth)acryloyloxy group include a (meth)acrylate compound having fluorine atoms in a molecule such as 2,2,2-trifluoroethyl(meth)acrylate, 2,2,3,3,3-pentafluoropropyl(meth)acrylate, 2-(perfluorobutyl)ethyl(meth)acrylate, 2-(perfluorohexyl)ethyl(meth)acrylate, 2-(perfluorooctyl)ethyl(meth)acrylate, 2-(perfluorodecyl)ethyl(meth)acrylate, α-trifluoromethyl methacrylate and α-trifluoroethyl methacrylate; and fluorine-containing polyfunctional (meth)acrylate compounds having a fluoroalkyl group, a fluorocycloalkyl group or a fluoroalkylene group, having 1 to 14 carbon atoms, which has at least three fluorine atoms in a molecule, and at least two (meth)acryloyloxy groups.

Examples of the polymerizable compounds having a heat-curable polar group containing fluorine atoms include 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide. Preferable examples of the heat-curable polar group include groups for forming a hydrogen bond such as a hydroxyl group, a carboxyl group, an amino group and an epoxy group. These groups are superior in not only the adhesion to a coat but also the affinity for an inorganic ultra fine particle such as silica.

Examples of the polymerizable compounds (fluororesin) having the ionizing radiation-curable group and the heat-curable polar group together include partially and fully fluorinated alkyl, alkenyl, or aryl esters of acrylic acid or methacrylic acid, fully or partially fluorinated vinyl ethers, fully or partially fluorinated vinyl esters, fully or partially fluorinated vinyl ketones, and the like.

Examples of the polymer of the polymerizable compound containing fluorine atoms include polymers of a monomer or a mixture of monomers, containing at least one fluorine-containing (meth)acrylate compound of the polymerizable compounds having the ionizing radiation-curable group; copolymers of at least one fluorine-containing (meth)acrylate compound and a (meth)acrylate compound not containing a fluorine atom in a molecule such as methyl(meth)acrylate, ethyl(meth)acrylate, propyl(meth)acrylate, butyl(meth)acrylate and 2-ethylhexyl(meth)acrylate; and monopolymers or copolymers of a fluorine-containing monomer like fluoroethylene, vinylidene fluoride, trifluoroethylene, chlorotrifluoroethylene, 3,3,3-trifluoropropylene, 1,1,2-trichloro-3,3,3-trifluoropropylene and hexafluoropropylene.

Further, silicone-containing vinylidene fluoride copolymer prepared by containing a silicone component in these copolymers can also be used as a polymer of the polymerizable compound. Examples of the silicone component in this case include (poly)dimethylsiloxane, (poly)diethylsiloxane, (poly)diphenylsiloxane, (poly)methylphenylsiloxane, alkyl modified (poly)dimethylsiloxane, azo group-containing (poly)dimethylsiloxane, dimethylsilicone, phenylmethylsilicone, alkyl-aralkyl modified silicone, fluorosilicone, polyether modified silicone, aliphatic acid ester modified silicone, methyl hydrogen silicone, silanol group-containing silicone, alkoxy group-containing silicone, phenol group-containing silicone, methacryl modified silicone, acryl modified silicone, amino modified silicone, carboxylic acid modified silicone, carbinol modified silicone, epoxy modified silicone, mercapto modified silicone, fluorine modified silicone, polyether modified silicone, and the like. Among others, a silicone component having a dimethylsiloxane structure is preferable.

In addition to the compounds described above, compounds obtained by reacting a fluorine-containing compound having at least one isocyanate group in a molecule with a compound having at least one functional group, which reacts with an isocyanate group such as an amino group, a hydroxyl group or a carboxyl group, in a molecule; compounds obtained by reacting fluorine-containing polyol such as fluorine-containing polyether polyols, fluorine-containing alkyl polyols, fluorine-containing polyester polyols and fluorine-containing ∈-caprolactone modified polyol with a compound having an isocyanate group; and the like can be used as a fluororesin.

In forming the low refractive index layer, the low refractive index layer can be formed through use of a composition (composition for forming a refractive index layer) including, for example, a raw material component. More specifically, a solution or a dispersion formed by dissolving and dispersing the raw material component (resin, etc.) and the additives (for example, "fine particles having voids" described later, a polymerization initiator, an antistatic agent, an antiglare agent, etc.) as required in a solvent is used as a composition for forming a low refractive index layer, and a coat of the composition is formed, and the coat is cured, and thereby a low refractive index layer can be obtained. In addition, examples of the additives such as the polymerization initiator, the antistatic agent, and the antiglare agent include the additives described in the antiglare layer or the antistatic layer.

Examples of the solvent include solvents described in the antiglare layer, and methyl isobutyl ketone, cyclohexanone, isopropyl alcohol (IPA), n-butanol, t-butanol, diethyl ketone, PGME, and the like are preferably employed.

A preparation method of the composition may be used as long as the components can be uniformly mixed and the components only have to be mixed according to a publicly known method. For example, the components can be mixed using publicly known apparatus described in a paragraph of formation of the antiglare layer.

The method of forming a coat only has to follow a publicly known method. For example, various methods described in a paragraph of formation of the antiglare layer can be employed.

A method of curing a coat obtained may be appropriately selected in accordance with the content of the composition. For example, when the composition is ultraviolet-curable, the composition may be cured by ultraviolet irradiation to the coat.

In the low refractive index layer, "fine particles having voids" are preferably used as a low refractive index agent. The "fine particles having voids" can reduce the refractive index of the antiglare layer while maintaining layer strength of the antiglare layer. In the present invention, the term "fine particles having voids" means particles having a structure in which the inside of the particle is filled with gas and/or a porous structure including gas is formed, and a characteristic that the refractive index is decreased in inverse proportion to a gas occupancy in the fine particle compared with the particle's own refractive index. In the present invention, a fine particle, in which a nano porous structure can be formed inside the coat and/or in at least a part of the coat surface, based on the configuration, the structure and the agglomeration condition of the fine particles and the state of dispersed particles in a coat, is included. The refractive index of the low refractive index layer using this particle can be adjusted to a refractive index of 1.30 to 1.45.

Examples of inorganic fine particles having voids include silica fine particles prepared by a method described in Japanese Kokai Publication 2001-233611. Silica fine particles prepared by a production method described in Japanese Kokai Publication Hei-7-133105, Japanese Kokai Publication 2002-79616, and Japanese Kokai Publication 2006-106714, may be used. Since the silica fine particle having voids is easily produced and has high particle's own hardness, layer strength thereof is enhanced and it becomes possible to adjust the refractive index to a range of about 1.20 to 1.45 when the particles are mixed with the binder resin to form the low refractive index layer. Particularly, specific preferable examples of organic fine particles having voids include hollow polymer particles prepared by use of a technology disclosed in Japanese Kokai Publication 2002-80503.

Examples of the particle, in which a nano porous structure can be formed inside the coat and/or in at least a part of the coat surface, include a slow-release agent produced for the purpose of increasing a specific surface area, in which various chemical substances is adsorbed on a column for filling and a porous portion of the surface, porous particles used for fixing a catalyst, and dispersed substances or agglomerated substances of hollow particles for the purpose of incorporating in a heat insulating material or a low dielectric material in addition to the silica particles. Specifically, it is possible to select and use the particles within the range of the preferable particle diameter of the present invention from agglomerated substances of porous silica particles of commercially available Nipsil or Nipgel (both trade name) produced by Nihon silica kogyo corporation and colloidal silica UP series (trade name), having a structure in which silica particles are linked with one another in a chain form, produced by Nissan Chemical Industries, Ltd.

An average particle diameter of the "fine particles having voids" is 5 nm or more and 300 nm or less, and preferably, a lower limit is 8 nm and an upper limit is 100 nm, more preferably, a lower limit is 10 nm and an upper limit is 80 nm. It becomes possible to impart excellent transparency to the antiglare layer when the average particle diameter of the particles falls within this range. In addition, the average particle diameter is measured by a dynamic light-scattering method. An amount of the "fine particles having voids" is usually about 0.1 to 500 parts by weight with respect to 100 parts by weight of a matrix resin in the low refractive index layer, and preferably about 10 to 200 parts by weight.

In forming the low refractive index layer, it is preferable to set the viscosity of the composition for forming a low refractive index layer in a range of 0.5 to 5 cps (25° C.) where a preferable application property is attained, and preferably 0.7 to 3 cps (25° C.). An excellent antireflection film of visible light can be realized, a uniform thin film can be formed without producing irregularity of application, and a low refractive index layer having particularly excellent adhesion to the substrate can be formed.

Means for hardening a resin may be the same one as described in a paragraph of the antiglare layer. When heating means is used for hardening the resin, preferably, a heat-polymerization initiator, which generates, for example, radicals by heat to initiate the polymerization of a polymerizable compound, is added to a fluororesin composition.

A film thickness (nm) $d_A$ of the low refractive index layer preferably satisfies the following equation (I):

$$d_A = m\lambda/(4n_A) \quad (I),$$

wherein $n_A$ represents a refractive index of the low refractive index layer, m represents a positive odd, and preferably 1, $\lambda$ is a wavelength, and preferably values from 480 nm to 580 nm.

Further, in the present invention, it is preferable from the viewpoint of reducing a reflection factor that the low refractive index layer satisfies the following equation (II):

$$120 < n_A d_A < 145 \quad (II).$$

Further, when such a low refractive index layer is provided, it is preferable that the antistatic layer has a surface roughness on its surface.

Examples of a method of forming the antistatic layer having surface roughness on its surface include a method of forming the layer by using a composition containing a diffusion filler in addition to the antistatic agent and the binder resin, described above.

The diffusion filler is a particle which is immiscible with the binder resin composing the antistatic layer and can impart the surface roughness to a coat. By containing the diffusion filler, the surface roughness can be formed on the surface of the antistatic layer.

The diffusion filler is preferably silica and/or organic resin beads. By using the silica and/or the organic resin beads, a surface roughness can be readily formed on the surface. Further, since the diffusion filler does not have an effect on antistatic performance, it is possible to achieve an excellent antiglare property or color reproducibility and the antistatic performance simultaneously. Among others, the diffusion filler is more preferably insulating organic resin beads in terms of the securement of stable antistatic performance and relative transparency.

The silica is not particularly limited and silica in any form of crystalline, sol, or gel may be used. Further, as the silica, commercialized products can be used, and examples of commercialized products include AEROSIL (Degussa, Ltd.), Colloidal Silica (produced by Nissan Chemical Industries Co., Ltd.) and nonspherical silica-containing ink (produced by Dainichiseika Color & Chemicals Mfg. Co., Ltd.).

Examples of the organic resin beads include monodispersion spherical particles such as acrylic beads (refractive index: 1.49 to 1.53), polyethylene beads (refractive index: 1.50), polystyrene beads (refractive index: 1.60), styrene-acrylic copolymer beads (refractive index: 1.54 to 1.55), polycarbonate beads (refractive index: 1.57), polyvinyl chloride beads (refractive index: 1.60), melamine beads (refractive index: 1.57), benzoguanamine-formaldehyde condensate beads, melamine-formaldehyde condensate beads, benzoguanamine-melamine-formaldehyde condensate beads (refractive index: 1.66) and benzoguanamine-melamine condensate beads (refractive index: 1.66). Among others, the organic resin beads are preferably the styrene-acrylic copolymer beads or the polystyrene beads in terms of formation of a more stable dispersion and easy handling when the organic resin beads are mixed with silica.

As the diffusion filler, silica or the organic resin beads may be used alone or in combination of two or more species.

A refractive index of the diffusion filler is preferably different from a refractive index of resins composing the antistatic layer. The reason for this is that an optical interference action due to the difference between refractive indexes can be prevented, to avoid the formation of interference fringes and interference coloring.

The diffusion filler preferably has an average particle diameter of 1 to 10 μm. If the average particle diameter is less than 1 μm, an effect of preventing interference may be deteriorated and the necessity to add a large amount of the diffusion filler may arise. If the average particle diameter is more than 10 μm, light transmittance is reduced and optical properties may be adversely affected in forming an optical layered body. More preferably, the average particle diameter is 2 to 5 μm.

The average particle diameter can be measured in the form of a 5% by weight dispersion of particles in toluene by a laser diffraction scattering particle size distribution analyzer.

The content of the diffusion filler is preferably 5 to 20 parts by weight with respect to 100 parts by weight of the solid content of the resin of the antistatic layer. If the content is less than 5 parts by weight, an effect of inhibiting interference may not be adequately obtained. If the content is more than 20 parts by weight, light transmittance is reduced and optical properties may be adversely affected in forming an optical layered body. More preferably, the content is 7.0 to 10 parts by weight.

The optical layered body of the present invention has a light-transmitting substrate and an antiglare layer, but it may include an antifouling layer, a high refractive index layer or a medium refractive index layer as an arbitrary layer as required in addition to the antistatic layer and the low refractive index layer described above. An antifouling agent, a high refractive index agent, a medium refractive index agent, an antistatic agent or a resin, usually used, is added to prepare compositions, and using these compositions, the antifouling layer, high refractive index layer and medium refractive index layer may be formed by a publicly known method.

A visible light transmittance of the optical layered body of the present invention is preferably 90% or more. If this transmittance is less than 90%, color reproducibility may be impaired in the case where the optical layered body is placed on the display surface. More preferably, the visible light transmittance is 95% or more.

A surface haze value of the optical layered body is preferably 10% or less. If the haze value is more than 10%, color reproducibility may be impaired in the case where the optical layered body is placed on the display surface. More preferably, the haze value is 0.2 to 5%. The haze value was obtained by measurement by a reflection and transmittance meter HM-150 (manufactured by Murakami Color Research Laboratory).

The internal haze value of the optical layered body is preferably 0.1 to 70%. When the internal haze value is within the above range, an effect of improving the preventing scintillation property is obtained in the case where the optical layered body of the present invention is used in an LCD. The internal haze value is more preferably 3 to 40%.

The surface haze value and internal haze value were obtained by a method described later. That is, a resin solution is prepared by diluting a resin (including resin components such as monomer and oligomer) such as pentaerythritol triacrylate with toluene so as to be 60% in solid content, and the obtained resin solution is applied onto the surface roughness on the outermost surface of the optical layered body with a wire bar in such a way that a dried film thickness is 8 μm. Thereby, the surface roughness on the outermost surface is buried and the outermost layer becomes a smooth layer. However, when a composition composing the outermost layer contains a leveling agent and therefore a recoat agent is repelled and hard to become wet, it is better that the optical layered body is subjected to hydrophilic treatment in advance by a saponification treatment (an optical layered body is immersed in a 2 mol/l NaOH (or KOH) solution at 55° C. for 3 minutes, and then the optical layered body is washed with water, and is wiped thoroughly with a kim-wipe, and then is dried in an oven at 50° C. for 1 minute). This optical layered body, the surface of which is smooth, becomes a state of not having haze due to the surface roughness but having only internal haze. This haze can be determined as an internal haze. Further, by subtracting the internal haze from haze of the original optical layered body (overall haze), haze resulting from only the surface roughness (surface haze) is determined.

The optical layered body of the present invention can be brought into a substance in which a surface roughness having the following factors is formed on its surface through the constitution described above. The configuration allows for a favorable image without any white muddiness or scintillation. That is, when denoting a mean angle of inclination of the surface roughness at the outermost surface layer of the optical layered body by θa, and a ten-point mean roughness of the surface roughness by Rz (definitions of θa and Rz are according to JIS B 0601 1994), the surface roughness is one in which θa is 0.2° or more and 1.5° or less, and Rz is 0.3 μm or more and 1.2 μm or less.

In addition, when θa and Rz are within the range recited, respectively, a mean spacing Sm of surface roughness at the outermost surface layer of the optical layered body is preferably 30 μm or more and 200 μm or less. Here, the mean spacing Sm is measured according to JIS B 0601 1994.

In addition, measuring conditions of a surface roughness measuring instrument used for determining Sm, θa and Rz are as follows.

Surface roughness measuring instrument (model: SE-3400, manufactured by Kosaka Laboratory Ltd.

1) Stylus of detection section of surface roughness:

Model: SE 2555N (2 micron standard) manufactured by Kosaka Laboratory Ltd.

(tip radius 2 μm, tip angle: 90°, material: diamond)

2) Measuring conditions of surface roughness measuring instrument

Reference length (cut off value μc of roughness curve) 0.8 mm

Evaluation length (Reference length (cut off value λc)×5): 4.0 mm

Measuring speed of stylus: 0.1 mm/s

However, when an appropriate measured value is not obtained under the measuring conditions, it is possible to suitably select the reference length (cut off value lc of roughness curve) from values such as 0.08 mm, 0.25 mm, 2.5 mm, and 8 mm. The appropriate range of the measured values under the respective measuring conditions is according to JIS B 0601 1994.

The optical layered body of the present invention can suitably prevent the deterioration of visibility such as the reflection due to external light, color irregularity and scintillation by having a surface with the surface roughness described above.

The optical layered body of the present invention includes an antiglare layer having the surface roughness on its surface as described above. That is, a method of producing an optical layered body of the present invention, including the step of forming an antiglare layer by applying a composition for forming an antiglare layer, containing the binder resin, the organic particle and the nonspherical silica, wherein the composition for forming an antiglare layer contains the organic particles and the nonspherical silica in the specific weight ratio described above. The method of producing an optical layered body like this also constitutes the present invention.

Figure 3:
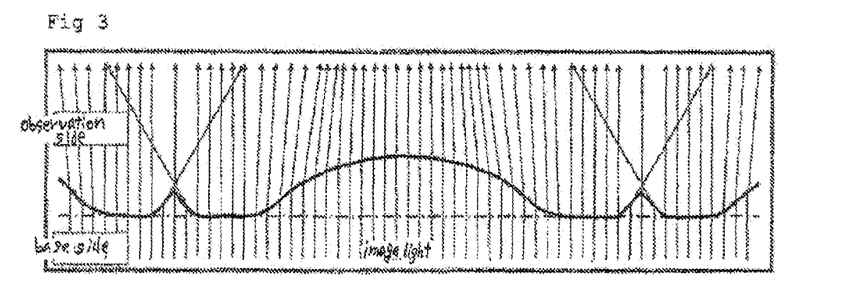
FIG. 3 is an example of a schematic view of an optical layered body of the present invention.
Figure 4:
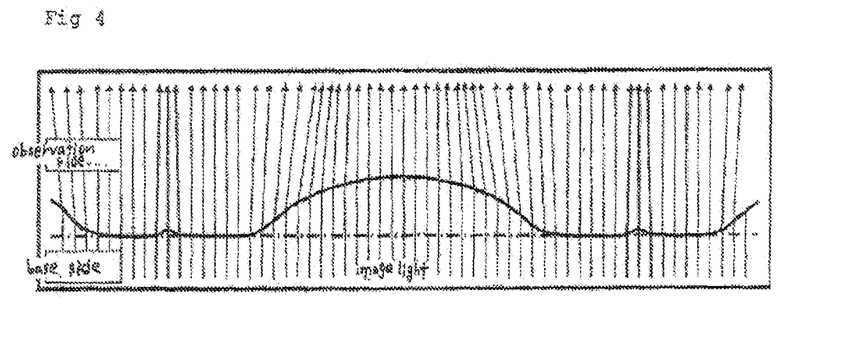
FIG. 4 is an example of a schematic view of an optical layered body of the present invention.
Figure 5:
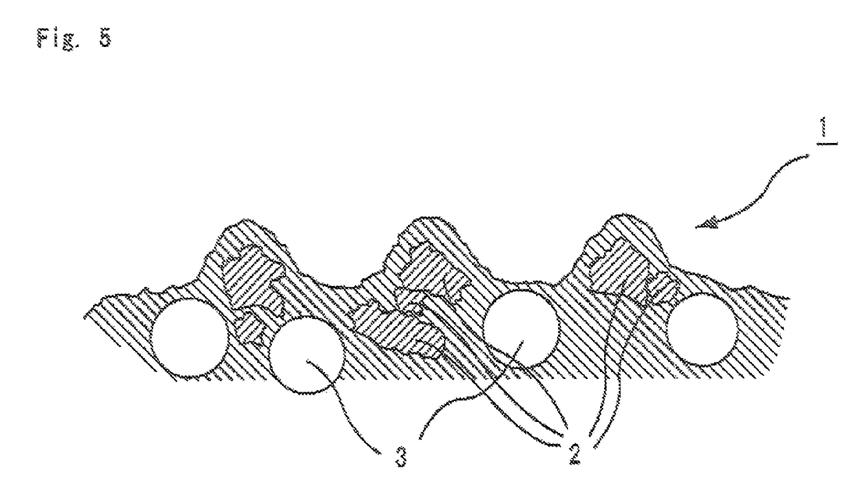
FIG. 5 illustrates a cross-sectional view of an antiglare layer containing two kinds of non-spherical silica particles 2 in an optical layered body of the present invention.

An aspect of the optical layered body of the present invention will be described by use of FIGS. 3 and 4. FIG. 3 shows an optical layered body including a low refractive index layer 1, an antiglare layer 2 and a light-transmitting substrate 4 vertically in this order. The antiglare layer 2 includes nonspherical silica 5 and an organic particle 6. FIG. 4 shows an optical layered body in which in the optical layered body of FIG. 3, an antistatic agent 3 is provided between the antiglare layer 2 and the light-transmitting substrate 4. The optical layered body of the present invention may be composed of arbitrary layers in accordance with the objects, and it is not limited to the aspect described above.

The optical layered body of the present invention can be formed into a polarizer by providing the optical layered body on the side opposite to the side where the antiglare layer in the optical layered body exists on the surface of a polarizing element. The polarizer like this also constitutes the present invention.

The polarizing element is not particularly limited, and as the polarizing element, for example, a polyvinyl alcohol film, a polyvinyl formal film, a polyvinyl acetal film or an ethylene-vinyl acetate copolymer saponified film, which is dyed with iodine or the like and stretched, can be used. In laminating the polarizing element and the optical layered body of the present invention, preferably, the light-transmitting substrate is subjected to a saponification treatment. The adhesive property between the polarizing element and the optical layered body becomes good by the saponification treatment, and thus an antistatic effect can be attained.

The present invention also provides an image display device including the optical layered body or the polarizer at the outermost surfaces. The image display device may be a non-self-luminous image display device such as LCD, or may be a self-luminous image display device such as PDP, FED, ELD (organic EL, inorganic EL) and CRT.

The LCD, which is a typical example of the non-self-luminous type, includes a light-transmitting display and a light source apparatus to irradiate the light-transmitting display from the backside. When the image display device of the present invention is an LCD, the optical layered body of the present invention or the polarizer of the present invention is formed on the surface of this light-transmitting display.

When the present invention provides a liquid crystal display device having the optical layered body, a light source of the light source apparatus irradiates from the side on which the light-transmitting substrate exists of the optical layered body. In addition, in the SNT type liquid crystal display device, a retardation plate may be inserted between a liquid crystal display element and the polarizer. An adhesive layer may be provided between the respective layers of this liquid crystal display device as required.

The PDP, which is the self-luminous image display device, includes a surface glass substrate and a backside glass substrate which is located at a position opposite to the surface glass substrate with a discharge gas filled between these substrates. When the image display device of the present invention is a PDP, the PDP includes the optical layered body described above on the surface of the surface glass substrate or a front plate (glass substrate or film substrate) thereof.

The self-luminous image display device may be an ELD apparatus in which luminous substances of zinc sulfide or diamines materials to emit light through the application of a voltage are deposited on a glass substrate by vapor deposition and display is performed by controlling a voltage to be applied to the substrate, or image display devices such as CRT, which converts electric signals to light to generate visible images. In this case, the image display device includes the optical layered body described above on the outermost surface of each of the display devices or on the surface a front plate thereof.

The optical layered body of the present invention can be used for displays such as televisions, computers, and word processors in any case. Particularly, it can be suitably used for the surfaces of displays for high-resolution images such as CRTs, liquid crystal panels, PDPs and ELDs.

EFFECT OF THE INVENTION

Since the optical layered body of the present invention has the constitution described above, it can form a desired fine surface roughness on its surface and it can make displays superior in visibility such as an antiglare property and appearance. Therefore, the optical layered body of the present invention can be suitably applied to cathode ray tube (CRT) display devices, liquid crystal displays (LCD), plasma displays (PDP), and electroluminescence displays (ELD).

EXPLANATION OF THE NUMERICAL SYMBOLS

| | | |
|---|---|---|
| 1, 10 | surface roughness | |
| 2, 11, 35 | nonspherical silica | |
| 3, 36 | organic particles | |
| 31 | low refractive index layer | |
| 32 | antiglare layer | |
| 33 | antistatic layer | |
| 34 | light-transmitting substrate | |

BEST MODE FOR CARRYING OUT THE INVENTION

Hereinafter, the present invention will be described in more detail by way of examples, but the present invention is not to be construed to limit to these embodiments. "Part(s)" and "%" refer to "part(s) by weight" and "% by weight", unless otherwise specified.

Preparation of Composition for Forming Antiglare Layer

Example 1

Preparation of Composition 1 for Forming Antiglare Layer

A composition was prepared by adequately mixing the following materials. This composition was filtrated with a polypropylene filter having a pore size of 30 μm to prepare a composition 1 for forming an antiglare layer.
Ultra Violet Curable Resin:
  Pentaerythritol triacrylate (PETA) (refractive index 1.51) 98.8 parts by weight
  Cellulose acetate propionate (molecular weight 50000) 1.2 parts by weight
Photocuring Initiator:
  Irgacure 184 (produced by Ciba Specialty Chemicals Inc.) 5.0 parts by weight
  Irgacure 907 (produced by Ciba Specialty Chemicals Inc.) 1.0 part by weight
Fine Particles (Inorganic Beads):
  Nonspherical silica A (average particle size 2.0 μm) 1.00 parts by weight
  Nonspherical silica B (average particle size 1.2 μm) 5.00 parts by weight
Fine Particles (Organic Particles)
Acrylic beads (component PMMA, average particle diameter 3.5 μm) 2.00 parts by weight
Silicon leveling agent 0.19 parts by weight
Toluene 80.0 parts by weight
Methyl isobutyl ketone 20.0 parts by weight

Example 2

Preparation of Composition 2 for Forming Antiglare Layer

A composition 2 for forming an antiglare layer was prepared in the same manner as in Example 1 except for using a mixture of acrylic beads (component PMMA, average particle diameter 3.5 μm) 2.00 parts by weight and styrene beads (average particle diameter 3.5 μm) 1.00 parts by weight in place of the fine particles (organic particles) in Example 1.

Example 3

Preparation of Composition 3 for Forming Antiglare Layer

A composition 3 for forming an antiglare layer was prepared in the same manner as in Example 1 except for using a mixture of acrylic beads (component PMMA, average particle diameter 3.5 μm) 2.00 parts by weight and styrene beads (average particle diameter 3.5 μm) 4.00 parts by weight in place of the fine particles (organic particles) in Example 1.

Example 4

Preparation of Composition 4 for Forming Antiglare Layer

A composition 4 for forming an antiglare layer was prepared in the same manner as in Example 1 except for using a mixture of styrene beads (average particle diameter 3.5 μm) 6.00 parts by weight and benzoguanamine-melamine condensate beads (average particle diameter 1.8 μm) 3.00 parts by weight in place of the fine particles (organic particles) in Example 1.

Example 5

Preparation of Composition 5 for Forming Antiglare Layer

A composition 5 for forming an antiglare layer was prepared in the same manner as in Example 1 except for using styrene-acrylic beads (average particle diameter 3.5 μm) 18.0 parts by weight in place of the fine particles (organic particles) in Example 1.

Comparative Example 1

Preparation of Composition 6 for Forming Antiglare Layer

A composition was prepared in the same manner as in Example 1 except for not adding the fine particles (organic particles) in Example 1, and the composition was filtrated with a polypropylene filter having a pore size of 30 μm to prepare a composition 6 for forming an antiglare layer.

Comparative Example 2

Preparation of Composition 7 for Forming Antiglare Layer

A composition 7 for forming an antiglare layer was prepared in the same manner as in Example 1 except for using nonspherical silica A (average particle size 2.0 μm) 3.00 parts by weight in place of the fine particles (inorganic particles) in Example 1, and except for using a mixture of acrylic beads (average particle diameter 5 μm) 20.00 parts by weight and styrene beads (average particle diameter 5 μm) 2.00 parts by weight in place of the fine particles (organic particles) in Example 1.

Formation of Antiglare Layer

Using a triacetyl cellulose film (TD 80U, produced by FUJIFILM Corporation) having a thickness of 80 μm as a transparent substrate, each of the compositions for forming an antiglare layer was applied onto the film with a wire wound rod for coating (a Mayer bar) #10, and the applied composition was heated to dry for 1 minute in an oven at 70° C. to evaporate the solvent fraction, and then a coat was cured by irradiating ultraviolet light to the coat at an exposure of 100 mJ under nitrogen purge (oxygen content: 200 ppm or less) to form an optical layered body. The total thickness of the antiglare layer on the substrate in this case was about 3.7 μm. In addition, a list of the fine particles used in the compositions for forming an antiglare layer is shown in Table 1.

(Evaluation)

Optical properties of the obtained optical layered bodies were evaluated according to the methods described below. The results are shown in Table 2.

<Preventing Scintillation Property>

A black matrix glass with 140 ppi and the obtained optical layered body is put in this order on a light box. Then, the obtained optical layered body was visually observed for the preventing scintillation property and evaluated according to the following criteria.

Excellent: There was little scintillation.

Good: Scintillation is improved.

Poor: There was no effect of preventing scintillation.

<Antiglare Property>

The obtained optical layered body is laminated on a black acrylic plate with a transparent adhesive there between in such a way that the transparent substance side is attached to the black acrylic plate. Then, the obtained optical layered body was visually observed for the antiglare property in a bright environment and evaluated according to the following criteria.

Good: There was no reflection of an image.

Poor: There was the reflection of an image.

<White Muddiness>

The obtained optical layered body is laminated on a black acrylic plate with a transparent adhesive there between in such a way that the transparent substance side is attached to the black acrylic plate. Then, the obtained optical layered body was visually observed for white muddiness in a bright environment and evaluated according to the following criteria.

Excellent: There was no white muddiness on the surface of the optical layered body. It is good. The surface looks clearly black.

Good: There was no white muddiness on the surface of the optical layered body. It is good.

Poor: There was white muddiness on the entire surface of the optical layered body.

<θa, Rz and Sm>

θa, Rz and Sm of the obtained optical layered bodies surfaces are evaluated by a method defined above in the description, according to JIS B0601 1994.

TABLE 1

| | Organic particles | | | | Amount ratio |
| --- | --- | --- | --- | --- | --- |
| | Nonspherical silica | Acrylic beads | Styrene beads | Styrene-acrylic beads | Benzoguanamine-melamine condensate beads | (to nonspherical silica of 10 parts by weight) |
| Example 1 | ○ | ○ | — | — | — | 3 |
| Example 2 | ○ | ○ | ○ | — | — | 5 |
| Example 3 | ○ | ○ | ○ | — | — | 10 |
| Example 4 | ○ | — | ○ | — | ○ | 15 |
| Example 5 | ○ | — | — | ○ | — | 30 |
| Comparative example 1 | ○ | — | — | — | — | 0 |
| Comparative example 2 | ○ | ○ | ○ | — | — | 73 |

TABLE 2

| | Preventing scintillation property | Anti-glare property | White muddiness | θ a(°) | Rz(μm) | Sm(μm) |
|---|---|---|---|---|---|---|
| Example 1 | Good | Good | Good | 1.1880 | 0.8930 | 77.2 |
| Example 2 | Good to Excellent | Good | Good | 1.2330 | 0.9180 | 69.7 |
| Example 3 | Excellent | Good | Excellent | 0.4090 | 0.5987 | 101.1 |
| Example 4 | Excellent | Good | Excellent | 1.1170 | 0.8120 | 60.6 |
| Example 5 | Excellent | Good | Good | 1.0480 | 0.4630 | 41.6 |
| Comparative example 1 | Poor | Good | Good | 1.6120 | 1.4320 | 91.8 |
| Comparative example 2 | Excellent | Good | Poor | 7.6380 | 5.1010 | 78.1 |

It was proven from Table 2 that the optical layered bodies of the Examples had excellent an antiglare property and a preventing scintillation property, and preferable gloss blackness without white muddiness.

INDUSTRIAL APPLICABILITY

The optical layered body of the present invention can be suitably applied to cathode ray tube (CRT) display devices, liquid crystal displays (LCD), plasma displays (PDP), electroluminescence displays (ELD) or the like.

The invention claimed is:

1. An optical layered body, comprising a
light-transmitting substrate and an antiglare layer having a surface roughness on its surface,
wherein said antiglare layer is a resin layer containing an organic particle and a nonspherical silica, and a weight ratio of organic particle/nonspherical silica from 7/10 to 35/10 and the antiglare layer contains two kinds of organic particles, wherein the antiglare layer contains two kinds of nonspherical silica having different average particle size, wherein each of said two kinds of nonspherical silica having different average particle size have an average particle size of 0.5 to 5 μm, respectively, and
wherein the surface of said antiglare layer satisfies the following:
θa is 0.2° or more and 1.5° or less,
Rz is 0.3 μm or more and 1.2 μm or less,
Sm is 30 μm or more and 101.1 μm or less,
wherein θa represents a mean angle of inclination of the surface roughness at the outermost surface layer of the optical layered body, Rz represents a ten-point mean roughness of the surface roughness and Sm represents a mean spacing of surface roughness at the outermost surface, and wherein the layer thickness of the antiglare layer is 1 μm to 10 μm.

2. The optical layered body according to claim 1, wherein the antiglare layer has a convex portion and wherein the convex portion of the antiglare layer does not contain the two kinds of organic particles, and wherein the convex portion of the antiglare layer comprises consists of the two kinds of nonspherical silica and a binder resin.

3. The optical layered body according to claim 2, wherein the two kinds of organic particles have an average particle diameter of 1 to 10 gm.

4. The optical layered body according to claim 2, wherein the total content of the two kinds of organic particles and the two kinds of nonspherical silica is 1 to 40 parts by weight with respect to 100 parts by weight of the solid content of a binder resin.

5. The optical layered body according to claim 2, further comprising an antistatic layer,
wherein the antistatic layer and the antiglare layer, in an order, are provided on the light-transmitting substrate.

6. The optical layered body according to claim 1, wherein at least one of the two kinds of organic particles comprises at least one species selected from the group consisting of polymers of methyl methacrylate, melamine, benzoguanamine or styrene, and copolymers thereof.

7. The optical layered body according to claim 6, wherein the total content of the two kinds of organic particles and the two kinds of nonspherical silica is 1 to 40 parts by weight with respect to 100 parts by weight of the solid content of a binder resin.

8. The optical layered body according to claim 6, further comprising an antistatic layer,
wherein the antistatic layer and the antiglare layer, in an order, are provided on the light-transmitting substrate.

9. The optical layered body according to claim 6, wherein at least one of the two kinds of organic particles is a mixture of styrene beads and benzoguanamine-melamine condensate beads.

10. The optical layered body according to claim 1, wherein the two kinds of organic particles have an average particle diameter of 1 to 10 μm.

11. The optical layered body according to claim 10, wherein the total content of the two kinds of organic particles and the two kinds of nonspherical silica is 1 to 40 parts by weight with respect to 100 parts by weight of the solid content of a binder resin.

12. The optical layered body according to claim 10, further comprising an antistatic layer,
wherein the antistatic layer and the antiglare layer, in an order, are provided on the light-transmitting substrate.

13. The optical layered body according to claim 1, wherein the total content of the two kinds of organic particles and the two kinds of nonspherical silica is 1 to 40 parts by weight with respect to 100 parts by weight of the solid content of a binder resin.

14. The optical layered body according to claim 1, further comprising an antistatic layer,
wherein the antistatic layer and the antiglare layer, in an order, are provided on the light-transmitting substrate.

15. The optical layered body according to claim 14, further comprising a low refractive index layer on the antiglare layer.

16. A self-luminous image display device, comprising the optical layered body according to claim 1, on the outermost surface.

17. A polarizer comprising a polarizing element,
wherein the polarizer includes the optical layered body according to claim 1, on a surface of the polarizing element.

18. A non-self-luminous image display device, comprising the optical layered body according to claim 1, on the outermost surface.

19. The optical layered body according to claim 1, wherein the layer thickness of the antiglare layer is 2 μm to 6 μm.

20. The optical layered body according to claim 1, wherein each of the two kinds of nonspherical silica has an average particle size of 1.0 to 2.5 μm.

21. The optical layered body according to claim 1, wherein the Rz is 0.5987 μm or more and 0.8120 μm or less, and the Sm is 60.6 μm or more and 101.1 μm or less.

22. A method of producing an optical layered body, including a light-transmitting substrate and an antiglare layer having a surface roughness on its surface, comprising a step of forming the antiglare layer by applying a composition for forming an antiglare layer, containing a binder resin, an organic particle and a nonspherical silica,
 wherein said composition for forming an antiglare layer contains said organic particle and said nonspherical silica, and a weight ratio of organic particle/nonspherical silica from 7/10 to 35/10 and the antiglare layer contains two kinds of organic particles, wherein the antiglare layer contains two kinds of nonspherical silica having different average particle size, wherein each of said two kinds of nonspherical silica having different average particle size have an average particle size of 0.5 to 5 μm, respectively, and wherein the surface of said antiglare layer satisfies the following:
 θa is 0.2° or more and 1.5° or less,
 Rz is 0.3 μm or more and 1.2 μm or less,
 Sm is 30 μm or more and 101.1 μm or less,
wherein θa represents a mean angle of inclination of the surface roughness at the outermost surface layer of the optical layered body, Rz represents a ten-point mean roughness of the surface roughness and Sm represents a mean spacing of surface roughness at the outermost surface.

\* \* \* \* \*